United States Patent
Nagano et al.

(10) Patent No.: US 12,031,203 B2
(45) Date of Patent: Jul. 9, 2024

(54) GALVANNEALED STEEL SHEET

(71) Applicant: NIPPON STEEL CORPORATION, Tokyo (JP)

(72) Inventors: Mai Nagano, Tokyo (JP); Koutarou Hayashi, Tokyo (JP); Akihiro Uenishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 694 days.

(21) Appl. No.: 17/277,658

(22) PCT Filed: Oct. 4, 2019

(86) PCT No.: PCT/JP2019/039251
§ 371 (c)(1),
(2) Date: Mar. 18, 2021

(87) PCT Pub. No.: WO2020/071523
PCT Pub. Date: Apr. 9, 2020

(65) Prior Publication Data
US 2022/0025497 A1    Jan. 27, 2022

(30) Foreign Application Priority Data
Oct. 4, 2018   (JP) ................. 2018-189222

(51) Int. Cl.
| | |
|---|---|
| C22C 38/02 | (2006.01) |
| C21D 9/46 | (2006.01) |
| C22C 38/00 | (2006.01) |
| C22C 38/04 | (2006.01) |
| C22C 38/42 | (2006.01) |
| C22C 38/44 | (2006.01) |
| C22C 38/46 | (2006.01) |
| C22C 38/50 | (2006.01) |
| C22C 38/54 | (2006.01) |
| C22C 38/58 | (2006.01) |
| C23C 2/02 | (2006.01) |
| C23C 2/28 | (2006.01) |
| C23C 2/40 | (2006.01) |

(52) U.S. Cl.
CPC ............. *C22C 38/58* (2013.01); *C21D 9/46* (2013.01); *C22C 38/002* (2013.01); *C22C 38/005* (2013.01); *C22C 38/02* (2013.01); *C22C 38/04* (2013.01); *C22C 38/42* (2013.01); *C22C 38/44* (2013.01); *C22C 38/46* (2013.01); *C22C 38/50* (2013.01); *C22C 38/54* (2013.01); *C23C 2/02* (2013.01); *C23C 2/022* (2022.08); *C23C 2/0224* (2022.08); *C23C 2/024* (2022.08); *C23C 2/28* (2013.01); *C23C 2/29* (2022.08); *C23C 2/40* (2013.01); *C21D 2211/002* (2013.01); *C21D 2211/005* (2013.01); *C21D 2211/008* (2013.01)

(58) Field of Classification Search
CPC ..................................................... C22C 38/04
See application file for complete search history.

(56) References Cited

U.S. PATENT DOCUMENTS

| | | | |
|---|---|---|---|
| 2013/0167980 A1* | 7/2013 | Kawata | ................. C22C 38/12 148/333 |
| 2017/0009315 A1 | 1/2017 | Shibata et al. | |
| 2017/0088914 A1 | 3/2017 | Keds et al. | |
| 2019/0003009 A1 | 1/2019 | Kawata et al. | |
| 2019/0144966 A1 | 5/2019 | Yabu et al. | |

FOREIGN PATENT DOCUMENTS

| | | |
|---|---|---|
| EP | 2 738 278 A1 | 6/2014 |
| EP | 3 421 633 A1 | 1/2019 |
| JP | 2003-277884 A | 10/2003 |
| JP | 2007-70649 A | 3/2007 |
| JP | 2007-70659 A | 3/2007 |
| JP | 2008-144233 A | 6/2008 |
| JP | 2013-144830 A | 7/2013 |
| JP | 2018-090874 A | 6/2018 |
| WO | 2015/133550 A1 | 9/2015 |
| WO | 2015/148892 A1 | 10/2015 |
| WO | 2017/184348 A1 | 9/2017 |
| WO | 2018/030400 A1 | 2/2018 |

OTHER PUBLICATIONS

"Metallic materials—Tensile testing—Method of test at room temperature", JIS Z 2241, 2011, total of 37 pages.
Nakaoka et al., "Strength, Ductility and Aging Properties of Continuously-Annealed Dual-Phase High-Strength Sheet Steels", Formable HSLA and Dual-Phase Steels, Metall. Soc. of AIME, (1977), pp. 126-141.
Poling et al., "High Strain Rate Deformation Response of DP980 and QP980 Automotive Sheet Steels", Materials Science & Technology Conference and Exhibition 2014, (MS&T'14), vol. 3, pp. 2039-2046.

* cited by examiner

*Primary Examiner* — Jophy S. Koshy
*Assistant Examiner* — Joshua S Carpenter
(74) *Attorney, Agent, or Firm* — Birch, Stewart, Kolasch & Birch, LLP

(57) ABSTRACT

A galvannealed steel sheet according to one aspect of the present invention has a hot-dip galvannealed layer on at least one surface of the steel sheet, and the steel sheet has a predetermined chemical composition, in which the steel sheet contains 10% or more and 90% or less of ferrite, and 10% or more of tempered martensite and tempered bainite in terms of an area ratio, a sum of the ferrite, the tempered martensite, and the tempered bainite is 90% or more, carbides having a major axis of 50 nm or more and 300 nm or less are contained in grains of the ferrite in a number density of $20/\mu m^2$ or more, and a two-dimensional homogeneous dispersion ratio S of Mn is 0.75 or more and 1.30 or less.

2 Claims, No Drawings

GALVANNEALED STEEL SHEET

TECHNICAL FIELD OF THE INVENTION

The present invention relates to a galvannealed steel sheet, and particularly to a galvannealed steel sheet that is suitable for a structural member of a vehicle and the like, which is mainly press-formed to be used, and is excellent in bake hardening performance for coating.

Priority is claimed on Japanese Patent Application No. 2018-189222, filed Oct. 4, 2018, the content of which is incorporated herein by reference.

RELATED ART

Steel sheets used in vehicles have achieved high-strengthening year by year. This is to improve the collision characteristics that deteriorate due to a reduction in the weight of the vehicle body as the weight of the vehicle body has been reduced. Since most components for vehicles are manufactured by press forming, high strength and excellent formability are simultaneously required. Therefore, there is a demand for a material that is relatively soft and easily formed during forming and has high strength after forming, that is, a material having a large bake hardening amount during baking for coating.

The bake hardening is a strain aging phenomenon that occurs when interstitial elements (mainly carbon) diffuse into dislocations formed by press forming (hereinafter, also referred to as "prestrain") during baking for coating at 100° C. to 200° C. and lock the dislocations. As shown in Non-Patent Document 1, the bake hardening amount depends on the amount of interstitial solid solution element, that is, the amount of solid solution carbon.

Patent Document 1 discloses a cold-rolled steel sheet that primarily contains a structure composed of bainite and martensite and secures high bake hardenability by limiting the area ratio of ferrite to 5% or less. Hereinafter, a structure containing one or more of bainite and martensite is called a hard structure. From this, it is considered that the bake hardening amount is higher in a hard structure having a larger amount of carbon that can be solid-solubilized than in ferrite having a smaller amount of carbon that can be solid-solubilized. Therefore, in order to increase the bake hardening amount, it is better to have a large amount of hard structure.

On the other hand, in order to further improve the collision characteristics, it is important not only to increase the bake hardening amount, but also to increase ultimate deformability after bake hardening. The ultimate deformability is a characteristic indicating how much strain can be withstood in a process in which a structure undergoes ductile fracture, and is evaluated by, for example, local elongation after bake hardening and a sheet thickness reduction ratio. The steel sheet as described in Patent Document 1 has a high bake hardening amount, but has a large amount of hard structure, so that the elongation after bake hardening is low, and therefore the ultimate deformability of the material is poor. In Non-Patent Document 2, it is suggested by a stress-strain curve that local elongation after bake hardening in steel with composite structure (DP steel) having a tensile strength of 980 MPa class is lower than local elongation of a material. This tendency is increased as the amount of hard structure increases. Therefore, it is considered that in order to increase the ultimate deformability after bake hardening, it is better to reduce the amount of hard structure. In particular, in a plated steel sheet in which transformation of a hard structure is unavoidable in a process of alloying a plating, it is difficult to secure the ultimate deformability after bake hardening.

As described above, in a composite structure, there is a trade-off relationship between the bake hardening amount and the ultimate deformability after bake hardening, and securing both characteristics has been an issue.

In order to secure the ultimate deformability after bake hardening, it is important to make the structure uniform, and a tempering treatment can be adopted as a method for that purpose. Patent Document 2 discloses a steel sheet having improved hole expansibility while maintaining good elongation by utilizing a tempering treatment. However, the steel sheet specifically disclosed in Patent Document 2 has a martensite volume percentage of about 25% or less and a relatively small amount of hard structure, and therefore there is room for improvement from the viewpoint of increasing the bake hardening amount. Patent Document 3 discloses a steel sheet having improved bake hardenability by containing tempered martensite or tempered bainite. However, in Patent Document 3, no sufficient examination has been made from the viewpoint of improving the ultimate deformability after bake hardening.

PRIOR ART DOCUMENT

Patent Document

[Patent Document 1] Japanese Unexamined Patent Application, First Publication No. 2008-144233
[Patent Document 2] Japanese Unexamined Patent Application, First Publication No. 2013-144830
[Patent Document 3] Japanese Unexamined Patent Application, First Publication No. 2003-277884

Non-Patent Document

[Non-Patent Document 1] K. Nakaoka, et al., "Strength, Ductility and Aging Properties of Continuously-Annealed Dual-Phase High-Strength Sheet Steels", Formable HSLA and Dual-Phase Steels, Metall. Soc. of AIME, (1977) 126-141
[Non-Patent Document 2] W. A. Polling, et al., "High Straight Rate Deformation Response of DP980 and QP980 Automotive Sheet Steels", Materials Science & Technology Conference and Exhibition 2014 (MS&T'14), Vol. 3, 2039-2046

DISCLOSURE OF THE INVENTION

Problems to be Solved by the Invention

Therefore, an object of the present invention is to provide a galvannealed steel sheet having a high bake hardening amount and excellent ultimate deformability after bake hardening.

Means for Solving the Problem

In order to improve both the bake hardening amount and the ultimate deformability after bake hardening, in general, it is necessary to achieve both a state in which bake hardening due to locking of dislocations introduced by prestrain is exhibited in each structure, and a state in which the structure after the bake hardening is uniform.

Therefore, the present inventors conducted intensive examinations to achieve the above object. As a result, it was found that it is important to control a prestrain distribution amount to each structure in order to increase the bake hardening amount in a composite structure. It was also found that a high bake hardening amount can be obtained by controlling the prestrain distribution amount with a structure even if the structure is not entirely a hard structure. The controlling factors of the prestrain distribution amount are the area ratio, the morphology, and the mechanical properties of each structure. By distributing an appropriate amount of prestrain to each of ferrite and the hard structure, a high degree of bake hardening occurs in each structure, and the maximum bake hardening amount as a composite structure can be obtained.

As described above, the controlling factors of the prestrain distribution amount are the area ratio, the morphology, and the mechanical properties of each structure. However, the present inventors found that it is difficult to perform such control due to the following (1) and (2).

(1) The hardness of the hard structure varies greatly in the hard structure.
(2) The difference in hardness between the hard structure and ferrite is large and non-uniform.

(1) was caused by unevenness in the martensitic transformation (Ms) points that appeared during the primary cooling of annealing, and unevenness in the bainitic transformation (Bs) points that appeared during isothermal holding and a plating alloying treatment, and furthermore, by Mn segregation. Therefore, examinations had to be performed so that the hardness of the hard structure is as uniform as possible by reducing the Mn segregation. (2) was caused by the generation of coarse carbides from ferrite grain boundaries or MnS as the origin after the generation of the hard structure, for example, the generation of iron carbides such as cementite, which caused ferrite to be softened. Therefore, examinations had to be performed so that the difference in hardness between the hard structure and ferrite is reduced by causing such carbides to finely precipitate in the ferrite grains.

Therefore, the present inventors conducted further intensive examinations. As a result, it was clarified that by controlling hot rolling conditions and making Mn segregation into a complicated shape, (a) the hardness of a hard phase becomes uniform, and
(b) since MnS is uniformly present, coarse carbides are not generated at ferrite grain boundaries when cooled to room temperature after plating, and thereafter, by performing tempering at an appropriate temperature, carbides are precipitated in the ferrite grains. Accordingly, it was found that a uniform structure was generated and the ultimate deformability after bake hardening was also improved.

A galvannealed steel sheet that achieved the above object in this way is as follows.

(A) A galvannealed steel sheet according to an aspect of the present invention has a hot-dip galvannealed layer on at least one surface of a steel sheet, the steel sheet includes, by mass %: C: 0.03% to 0.30%; Si: 0.200% to 2.000%; Mn: 2.00% to 4.00%; P: 0.100% or less; S: 0.010% or less; Al: 0.001% to 2.000%; N: 0.010% or less; Ti: 0% to 0.100%; Nb: 0% to 0.100%; V: 0% to 0.100%; Cu: 0% to 1.000%; Ni: 0% to 1.000%; Mo: 0% to 1.000%; Cr: 0% to 1.000%; W: 0% to 0.005%; Ca: 0% to 0.005%; Mg: 0% to 0.005%; REM: 0% to 0.010%; B: 0% to 0.0030%; and a remainder consisting of Fe and impurities, in which the steel sheet contains 10% or more and 90% or less of ferrite, and 10% or more of tempered martensite and tempered bainite in terms of an area ratio, a sum of the ferrite, the tempered martensite, and the tempered bainite is 90% or more, carbides having a major axis of 50 nm or more and 300 nm or less are contained in grains of the ferrite in a number density of 20/μm² or more, and a two-dimensional homogeneous dispersion ratio S defined by Formula (1) is 0.75 or more and 1.30 or less, $$S=Sy^2/Sx^2 \qquad \text{Formula (1)}$$

where $Sx^2$ in Formula (1) is a dispersion value of Mn concentration profile data in a sheet width direction, and $Sy^2$ is a dispersion value of Mn concentration profile data in a sheet thickness direction.

(B) In the galvannealed steel sheet according to (A), the steel sheet may contain one or two or more of, by mass %; Ti: 0.003% to 0.100%, Nb: 0.003% to 0.100%, and V: 0.003% to 0.100%, in a total amount of 0.100% or less.

Effects of the Invention

According to the present invention, it is possible to provide a galvannealed steel sheet which has a composite structure including a hard phase composed of tempered martensite and tempered bainite with Mn segregation in a complicated shape and ferrite precipitation-hardened with intragranular carbides, and is excellent in bake hardening amount and ultimate deformability after bake hardening. This galvannealed steel sheet has excellent press formability, is further high-strengthened by being baked during coating after press forming, is also excellent in subsequent ultimate deformability, and is thus suitable as a structural member in an automotive field.

EMBODIMENTS OF THE INVENTION

A galvannealed steel sheet according to an embodiment of the present invention is a galvannealed steel sheet having a hot-dip galvannealed layer on at least one surface of a steel sheet, the steel sheet including, by mass %: C: 0.03% to 0.30%; Si: 0.200% to 2.000%; Mn: 2.00% to 4.00%; P: 0.100% or less; S: 0.010% or less; Al: 0.001% to 2.000%; N: 0.010% or less; Ti: 0% to 0.100%; Nb: 0% to 0.100%; V: 0% to 0.100%; Cu: 0% to 1.000%; Ni: 0% to 1.000%; Mo: 0% to 1.000%; Cr: 0% to 1.000%; W: 0% to 0.005%; Ca: 0% to 0.005%; Mg: 0% to 0.005%; REM: 0% to 0.010%; B: 0% to 0.0030%; and a remainder consisting of Fe and impurities, in which the steel sheet contains 10% or more and 90% or less of ferrite, and 10% or more of tempered martensite and tempered bainite in terms of an area ratio, a sum of the ferrite, the tempered martensite, and the tempered bainite is 90% or more, carbides having a major axis of 50 nm or more and 300 nm or less are contained in grains of the ferrite in a number density of 20/μm² or more, and a two-dimensional homogeneous dispersion ratio S defined by Formula (1) is 0.75 or more and 1.30 or less, $$S=Sy^2/Sx^2 \qquad \text{Formula (1)}$$

where $Sx^2$ in Formula (1) is a dispersion value of Mn concentration profile data in a sheet width direction, and $Sy^2$ is a dispersion value of Mn concentration profile data in a sheet thickness direction.

(1) Chemical Composition

First, the chemical composition of the steel sheet according to the embodiment of the present invention and a slab used for the manufacturing thereof will be described. In the following description, "%", which is the unit of the amount of each element contained in the steel sheet and the slab, means "mass %" unless otherwise specified.

(C: 0.03% to 0.30%)

C has an action of increasing the amount of solid solution carbon and enhancing bake hardenability. In addition, C has an action of enhancing hardenability and increasing strength by being contained in a martensite structure. In order to effectively exhibit the above action, the C content is set to 0.05% or more, and preferably 0.07% or more. On the other hand, when the C content exceeds 0.30%, weldability deteriorates. Therefore, the C content is set to 0.30% or less, and preferably 0.20% or less. The C content may be set to 0.06% or more, 0.10% or more, or 0.12% or more. The C content may be set to 0.25% or less, 0.18% or less, or 0.16% or less.

(Si: 0.200% to 2.000%)

Si is an element necessary for generating fine carbides in ferrite grains by suppressing the generation of coarse carbides, and for securing the amount of solid solution carbon required for bake hardening. When the Si content is less than 0.200%, carbides are generated not in the grains but at the grain boundaries, so that the amount of solid solution carbon is reduced and the bake hardenability is lowered. Furthermore, the intergranular carbides also reduce ultimate deformability after bake hardening. Therefore, the Si content is set to 0.200% or more. Si is also useful for high-strengthening of steel sheets having excellent bake hardening. In order to effectively exhibit this effect, the Si content is preferably set to 0.500% or more. On the other hand, when the Si content exceeds 2.000%, surface properties deteriorate or the effect of adding Si is saturated, resulting in an unnecessary increase in cost. Therefore, the Si content is set to 2.000% or less, and preferably 1.500% or less. The Si content may be set to 0.250% or more, 0.300% or more, 0.700% or more, or 1.000% or more. The Si content may be set to 1.800% or less, 1.300% or less, or 1.100% or less.

(Mn: 2.00% to 4.00%)

Mn is an element that improves hardenability and is an element necessary for forming a martensite structure. In order not to limit a cooling rate for generating martensite, the Mn content is set to 2.00% or more, and preferably 2.30% or more. However, the higher the Mn content, the greater the amount of MnS precipitated. Since MnS is a nucleation site for coarse carbides, such as iron carbides such as cementite, MnS may not be contained. Therefore, the Mn content is set to 4.00% or less, and preferably 3.50% or less. In general, the addition of Mn promotes Mn segregation and reduces bake hardenability. However, in the embodiment of the present invention, by making such Mn segregation into a complicated shape, the bake hardenability can be improved. The Mn content may be set to 2.20% or more, 2.50% or more, or 2.80% or more. The Mn content may be set to 3.70% or less, 3.20% or less, or 3.00% or less.

(Al: 0.001% to 2.000%)

Al has an effect on deoxidizing and improving the yield of carbide-forming elements. In order to effectively exhibit the above action, the Al content is set to 0.001% or more, and preferably 0.010% or more. On the other hand, when the Al content exceeds 2.000%, the weldability decreases or oxide-based inclusions are increased in amount, resulting in the deterioration of surface properties. Therefore, the Al content is set to 2.000% or less, and preferably 1.000% or less. The Al content may be set to 0.020% or more, 0.050 or more, or 0.100% or more. The Al content may be set to 0.800% or less, 0.500% or less, or 0.300% or less.

(P: 0.100% or Less)

P is not an essential element, but is contained, for example, as an impurity in steel. From the viewpoint of weldability, the lower the P content, the better. In particular, when the P content exceeds 0.100%, a reduction in weldability is significant. Therefore, the P content is set to 0.100% or less, and preferably 0.030% or less. The P content may be 0%. However, it takes a cost to reduce the P content, and a reduction in the P content to less than 0.0001% causes a significant increase in the cost. Therefore, the P content may be set to 0.0001% or more. Furthermore, since P contributes to an improvement in strength, the P content may be set to 0.0001% or more from such a viewpoint. The P content may be set to 0.002% or more, 0.005% or more, or 0.009% or more. The P content may be set to 0.080% or less, 0.050% or less, or 0.040% or less.

(S: 0.010% or Less)

S is not an essential element, but is contained, for example, as an impurity in steel. From the viewpoint of weldability, the lower the S content, the better. As the S content increases, the amount of MnS precipitated increases. As described above, since MnS is a nucleation site for coarse carbides, MnS should not be contained. Furthermore, the presence of MnS deteriorates low temperature toughness. Such a phenomenon is particularly significant when the S content exceeds 0.01%. Therefore, the S content is set to 0.01% or less, and preferably 0.003% or less. The S content may be 0%. However, it takes a cost to reduce the S content, and a reduction in the S content to less than 0.0001% causes a significant increase in the cost. Therefore, the S content may be set to 0.0001% or more. The S content may be set to 0.0005% or more, 0.001% or more, or 0.003% or more. The S content may be set to 0.008% or less, 0.007% or less, or 0.005% or less.

(N: 0.010% or Less)

N is not an essential element, but is contained, for example, as an impurity in steel. From the viewpoint of weldability, the lower the N content, the better. In particular, when the N content exceeds 0.010%, a reduction in the weldability is significant. Therefore, the N content is set to 0.010% or less, and preferably 0.006% or less. The N content may be 0%. However, it takes a cost to reduce the N content, and a reduction in the N content to less than 0.0001% causes a significant increase in the cost. Therefore, the N content may be set to 0.0001% or more. The N content may be set to 0.001% or more, 0.002% or more, or 0.003% or more. The N content may be set to 0.008% or less, 0.006% or less, or 0.005% or less.

The basic composition of the steel sheet according to the embodiment of the present invention and the slab used for the manufacturing thereof is as described above. The steel sheet and the slab may further contain the following optional elements, if necessary. However, the steel sheet according to the embodiment of the present invention can achieve the object without containing these optional elements. Therefore, the lower limit of the amount of any optional element mentioned below is 0%.

(Ti: 0.100% or Less, Nb: 0.100% or Less, and V: 0.100% or Less)

Ti, Nb, and V contribute to an improvement in strength. Therefore, Ti, Nb, V, or any combination thereof may be contained. In order to sufficiently obtain this effect, the amount of Ti, Nb, or V, or the total amount of any combination of two or more thereof is preferably set to 0.003% or more. On the other hand, when the amount of Ti, Nb, or V or the total amount of any combination of two or more thereof exceeds 0.100%, it becomes difficult to perform hot rolling and cold rolling. Therefore, the amount of Ti, Nb, or V, or the total amount of any combination of two or more thereof is set to 0.100% or less. That is, it is preferable that the limit range in the case of including each element alone is set to Ti: 0.003% to 0.100%, Nb: 0.003% to 0.100%, and V: 0.003% to 0.100%, and the total amount thereof in the case of any combination thereof is also set to 0.003% to 0.100%.

(Cu: 1.000% or Less, Ni: 1.000% or Less, Mo: 1.000% or Less, and Cr: 1.000% or Less)

Cu, Ni, Mo, and Cr contribute to an improvement in strength. Therefore, Cu, Ni, Mo, Cr, or any combination thereof may be contained. In order to sufficiently obtain this effect, the amount of Cu, Ni, Mo, and Cr is preferably in a range of 0.005% to 1.000% in the case of including each element alone, and the total amount thereof in the case of any combination of two or more thereof preferably satisfies 0.005% or more and 1.000% or less. On the other hand, when the amount of Cu, Ni, Mo, and Cr or the total amount in the case of any combination of two or more thereof exceeds 1.000%, the effect due to the above-mentioned action is saturated and causes an increase in the cost. Therefore, the upper limit of the amount of Cu, Ni, Mo, and Cr or the total amount in the case of any combination of two or more thereof is set to 1.000%. That is, it is preferable that Cu: 0.005% to 1.000%, Ni: 0.005% to 1.000%, Mo: 0.005% to 1.000%, and Cr: 0.005% to 1.000% are set, and the total amount in the case of any combination thereof is 0.005% to 1.000%.

(W: 0.005% or Less, Ca: 0.005% or Less, Mg: 0.005% or Less, and REM: 0.010% or Less)

W, Ca, Mg, and REM (rare earth metal) contribute to the fine dispersion of inclusions and enhance toughness. Therefore, W, Ca, Mg, or REM or any combination thereof may be contained. In order to sufficiently obtain this effect, the total amount of W, Ca, Mg, and REM, or any combination of two or more thereof is preferably set to 0.0003% or more. On the other hand, when the total amount of W, Ca, Mg, and REM exceeds 0.010%, the surface properties deteriorate. Therefore, the total amount of W, Ca, Mg, and REM is set to 0.010% or less. That is, it is preferable that W: 0.005% or less, Ca: 0.005% or less, Mg: 0.005% or less, and REM: 0.010% or less are set, and the total amount of any two or more thereof is 0.0003% to 0.010%.

REM (rare earth metal) refers to a total of 17 elements including Sc, Y, and lanthanoids, and "REM content" means the total amount of these 17 elements. Lanthanoids are added industrially, for example, in the form of mischmetal.

(B: 0.0030% or Less)

B is an element that improves hardenability and is an element useful for high-strengthening of steel sheets for bake hardening. B may be contained in 0.0001% (1 ppm) or more. However, when B is added in more than 0.0030% (30 ppm), the above effect is saturated and it is economically useless. Therefore, the B content is set to 0.0030% (30 ppm) or less, and preferably 0.0025% (25 ppm) or less.

In the steel sheet according to the embodiment of the present invention, the remainder other than the above elements consists of Fe and impurities. The impurities are elements that are incorporated in due to various factors in a manufacturing process, including raw materials such as ores and scraps, when industrially manufacturing the steel sheet, and are not intentionally added to the steel sheet according to the embodiment of the present invention.

(II) Steel Structure

The galvannealed steel sheet according to the embodiment of the present invention has a great feature in that a composite structure containing at least two or more phases is included, and by controlling the composite structure, the distribution of prestrain is controlled and the bake hardenability is improved. The reason for defining the area ratio for each of the structures will be described.

(Ferrite: 10% or More and 90% or Less)

Ferrite is a structure having a low yield stress, and an excellent strain hardening property. Therefore, ferrite is essential for increasing the ultimate deformability after bake hardening. This effect is exhibited when the area ratio of ferrite is 10% or more. Therefore, the area ratio of ferrite in the steel sheet is set to 10% or more. In order to further increase the ultimate deformability after bake hardening, the area ratio of ferrite is set to preferably 20% or more, and more preferably 30% or more. When the area ratio of ferrite is excessively increased, bake hardening of the hard structure does not occur and the bake hardenability of the entire structure is significantly deteriorated. Therefore, the area ratio of ferrite in the steel sheet is set to 90% or less. In order to further increase the bake hardenability, the area ratio of ferrite is set to preferably 70% or less, and more preferably 50% or less. Therefore, the area ratio of ferrite is set to 10% or more, and preferably 20% or more. The area ratio of ferrite may be set to 15% or more, 25% or more, 30% or more, or 40%. The area ratio of ferrite may be set to 80% or less, 60% or less, 45% or less, or 40% or less.

(Tempered Martensite and Tempered Bainite: 10% or More)

In the embodiment of the present invention, phases other than the ferrite include tempered martensite and tempered bainite. Since the carbon concentration is higher in the hard structure (tempered martensite and tempered bainite) than in ferrite, the bake hardening amount is higher. However, in a case where soft ferrite and the hard structure are present as the composite structure, ferrite is responsible for most of the prestrain, so that the bake hardenability of the hard structure cannot be utilized in the related art. In order to improve the bake hardenability, it is important to let the hard structure be responsible for deformation. However, when the amount of the hard structure is too small, only the ferrite is responsible for deformation. Therefore, the amount of the hard structure needs to be 10% or more. Therefore, the area ratio of the hard structure is 10% or more, preferably 20% or more. On the other hand, when the area ratio of the hard structure exceeds 90%, the area ratio of ferrite decreases and the ultimate deformability after bake hardening decreases. Therefore, the area ratio of the hard structure is set to 90% or less. The area ratio of the hard structure may be set to 15% or more, 25% or more, 30% or more, or 40%. The area ratio of the hard structure may be set to 80% or less, 70% or less, 60% or less, or 50% or less.

Furthermore, in the embodiment of the present invention, in order to increase the bake hardening amount, the hard structure needs to be tempered martensite and tempered bainite. As described above, in order to improve the bake hardenability and the bendability and the ultimate deformability after bake hardening, as-quenched martensite and bainite in the composite structure need to be tempered.

In the embodiment of the present invention, the hard structure contains at least tempered martensite, preferably both tempered martensite and tempered bainite. This is because tempered martensite is harder than tempered bainite and tempered bainite can be responsible for strain that does not easily enter tempered martensite.

(Sum of Ferrite, Tempered Martensite, and Tempered Bainite: 90% or More)

In a preferred method of manufacturing the galvannealed steel sheet of the present invention, which will be described later, there are cases where pearlite and residual austenite are produced depending on the manufacturing conditions. The area ratio of these structures is obtained by subtracting the area ratios of ferrite and the hard structure measured as described above from 100%. In the embodiment of the present invention, control of the distribution of prestrain into ferrite and the hard structure is important. Therefore, in a case where the amount of other structures, that is, structures such as pearlite residual austenite, is small, the effect thereof can be ignored. Therefore, the sum of the area ratios of ferrite, tempered martensite, and tempered bainite is set to 90% or more, preferably 95% or more or 98% or more, and may be 100%.

In the present invention, the area ratio of ferrite and the area ratio of the hard structure are determined as follows. First, a sample is taken with a sheet thickness cross section perpendicular to a rolling direction of a steel sheet as an observed section, the observed section is polished, the structure thereof at a thickness ¼ position of the steel sheet is observed with a scanning electron microscope with an electron backscatter diffractometer (SEM-EBSD) at a magnification of 5,000-fold, the resultant is subjected to image analysis in a visual field of 100 m×100 m to measure the area ratio of ferrite, and the average of values measured at any five or more visual fields is determined as the area ratio of ferrite in the present invention.

Next, an SEM secondary electron image of a region at a depth from 3 t/8 to t/2 from the surface of the steel sheet is photographed. At this time, for example, the magnification is set to 1,500-fold. Since white portions of the obtained image data are hard structures and black portions are ferrite, the area ratio of the hard structures is determined based on the image data. The tempered state of the hard structure is determined as follows. When the SEM secondary electron image is observed, in a case where the contrast of laths and blocks contained in martensite and bainite is clear or fine carbides are precipitated in the structure when observed at 5,000-fold or 10,000-fold, for example, it is determined that the structure is tempered.

(Number Density of Carbides Having Major Axis of 50 nm or More and 300 nm or Less in Ferrite Grains Is 20/μm² or More)

In the embodiment of the present invention, it is important that fine carbides generated by tempering, such as iron carbides such as cementite, are present in the ferrite grains. Accordingly, ferrite undergoes precipitation hardening, and control of the distribution of prestrain between ferrite and the hard phase is possible. When precipitation points of the carbides are grain boundaries, the structure becomes non-uniform and the ultimate deformability after bake hardening decreases. Precipitation at grain boundaries occurs, for example, during cooling or by tempering at above 350° C. Therefore, the precipitation points of the fine carbides are within ferrite grains.

The carbides generated in the ferrite grains are fine needle-like carbides. Since ferrite undergoes precipitation hardening by finely and densely dispersing the carbides, in the steel sheet according to the present embodiment, the number density of carbides having a major axis of 50 nm or more and 300 nm or less needs to be 20/μm² or more. When the major axis of the carbide is less than 50 nm, there is no effect of hindering the movement of dislocations, and precipitation hardening does not occur. On the other hand, when the major axis of the carbide exceeds 300 nm, the carbide grows coarsely and the density of precipitated decreases, so that the movement of dislocations at places with no precipitates occurs, resulting in insufficient precipitation hardening. Therefore, the major axis of the carbide whose number density is to be measured is 50 nm or more and 300 nm or less. Carbides having a major axis of less than 50 nm or more than 300 nm do not adversely affect the characteristics of the steel sheet by themselves, and thus the number density thereof is not particularly limited. However, considering the possibility that the number density of carbides having a major axis of 50 nm or more and 300 nm or less may be insufficient, it is considered preferable that the number density of carbides having a major axis of less than 50 nm or more than 300 nm is as small as possible.

When the number density of carbides having a major axis of 50 nm or more and 300 nm or less is less than 20/μm², the density of precipitates is not sufficient, and the movement of dislocations at places with no precipitates occurs, resulting in insufficient precipitation hardening. Therefore, the number density of carbides having a major axis of 50 nm or more and 300 nm or less is set to 20/μm² or more. The number density of carbides having a major axis of 50 nm or more and 300 nm or less may be set to 25/μm² or more, 28/μm² or more, or 30/μm² or more. The upper limit of the number density of carbides having a major axis of 50 nm or more and 300 nm or less is not particularly limited, but may be set to 50/μm² or less, 45/μm² or less, 43/μm² or less, or 40/μm² or less.

In the present invention, the major axis and number density of the carbides are determined by observation with an electron microscope, and are measured by, for example, transmission electron microscope (TEM) observation. Specifically, a thin film sample is cut out from a region between a ⅜ position and a ¼ position of the thickness of the steel sheet from the surface of the steel sheet, and is observed in a bright visual field. The sample is cut by 1 μm² at an appropriate magnification of 10,000-fold to 100,000-fold, and among the carbides in the visual field, carbides having a major axis of 50 nm or more and 300 nm or less are counted and obtained. This operation is performed in five or more consecutive visual fields, and the average is taken as the number density.

(Two-Dimensional Homogeneous Dispersion Ratio S is 0.75 or More and 1.30 or Less)

The two-dimensional homogeneous dispersion ratio is an index for evaluating microsegregation of alloying elements. The two-dimensional homogeneous dispersion ratio represented by S is measured as follows. The sheet width direction is indicated as an x direction, the sheet thickness direction is indicated as a y direction, the steel sheet is adjusted so that a surface having the rolling direction thereof as a normal direction (that is, a cross section in the thickness direction of the steel sheet) can be observed, the surface is subjected to mirror polishing, and in a range of 100 μm×100 μm in the center portion of the steel sheet in the cross section in the thickness direction of the steel sheet, Mn concentrations are measured at 200 points at intervals of 0.5 m from one side toward the other side along the thickness direction (y direction) of the steel sheet by an electron probe microanalyzer (EPMA) device. In addition, along the direction (x direction) perpendicular to the thickness direction of the steel sheet measured, Mn concentrations are similarly measured at 200 points at intervals of 0.5 μm from one side toward the other side. The dispersion values $Sx^2$ and $Sy^2$ are obtained from the respective Mn concentration profiles in the x direction and the y direction. Using these values, S is calculated by Formula (1).

$$S = Sy^2/Sx^2 \quad \text{Formula (1)}$$

Here, $Sx^2$ is a dispersion value of Mn concentration profile data in the sheet width direction and is represented by $Sx^2=(1/200)\times\Sigma(A-A_i)^2$, and in the formula, A is the average value of Mn concentrations at 200 points in the x direction, and $A_i$ represents the i-th Mn concentration in the x direction (i=1 to 200). Similarly, $Sy^2$ is a dispersion value of Mn concentration profile data in the sheet thickness direction and is represented by $Sy^2=(1/200)\times\Sigma(B-B_i)^2$, and in the formula, B is the average value of Mn concentrations at 200 points in the y direction, and $B_i$ represents the i-th Mn concentration in the y direction (i=1 to 200).

The present embodiment is characterized in that microsegregation is relaxed by the Mn concentration distribution having a complicated shape. In the present embodiment, by allowing the Mn concentration not to be distributed in a band shape, and in connection with this, not only by simply reducing the fluctuation of the ratio of the hard structure in the thickness direction, but also by making the Mn concentration distribution a more complicated shape, it is possible to obtain a steel sheet having high strength, excellent bake hardenability, and excellent ultimate deformability after bake hardening. When this is less than 0.75, it cannot be said that a sufficiently complicated shape is formed, and the bake hardenability is low. Therefore, S needs to be 0.75 or more. S is preferably 0.85 or more, and more preferably 0.95 or more or 1.00 or more. On the other hand, in a case where the microsegregation is not controlled, planes with a high Mn concentration and planes with a low Mn concentration are continuous in layers in the sheet thickness direction, and it is important to homogenize the planes in the sheet thickness direction and the sheet width direction. On the contrary, when the planes with a high Mn concentration and planes with a low Mn concentration are continuous in layers in the sheet thickness direction, the planes are not homogenized. That is, the reciprocal of the lower limit of S becomes the upper limit. Therefore, S is set to 1.30 or less. S is preferably 1.20 or less, and more preferably 1.05 or less.

(Hot-Dip Galvannealed Layer)

The steel sheet according to the embodiment of the present invention has a hot-dip galvannealed layer on at least one surface, preferably both surfaces. The plating layer may be a hot-dip galvannealed layer having an any composition known to those skilled in the art, and may contain an additive element such as Al in addition to Zn. The adhesion amount of the plating layer is not particularly limited and may be a general adhesion amount.

(Mechanical Properties)

According to the galvannealed steel sheet having the above composition and structure, it is possible to achieve high tensile strength, specifically, a tensile strength of 600 MPa or more. Here, the tensile strength is set to 600 MPa or more in order to meet the demand for a reduction in the weight of a vehicle body. The tensile strength is preferably 700 MPa or more, and more preferably 800 MPa or more. Furthermore, according to the galvannealed steel sheet having the above composition and structure, it is possible to achieve an excellent bake hardening amount. More specifically, it is possible to achieve a bake hardening amount BH such that a value obtained by subtracting the stress at the time of application of 2% prestrain from the stress when a test piece subjected to a heat treatment at 170° C. for 20 minutes is re-tensioned after the application of 2% prestrain is 100 MPa or more, and preferably 120 MPa or more. When the value of BH is less than 100 MPa, it is difficult to perform forming and the strength after forming is low, so that it cannot be said excellent bake hardenability is achieved.

(III) Manufacturing Method

Next, a preferred manufacturing method of a galvannealed steel sheet according to the embodiment of the present invention will be described.

The following description is intended to exemplify the characteristic method for manufacturing the galvannealed steel sheet according to the embodiment of the present invention, and is not intended to limit the galvannealed steel sheet to be manufactured by the manufacturing method described below.

The manufacturing method is characterized by including:
a step of forming a slab by casting a molten steel having the chemical composition described above;
a rough rolling step of performing rough rolling on the slab in a temperature range of 1050° C. or higher and 1250° C. or lower, in which the rough rolling is performed by reverse rolling having a rolling reduction of 35% or less per pass, the reverse rolling includes two or more sets of rolling (six reciprocations) with a total of six passes (three reciprocations) as one set, the three reciprocations including the following (i) and (iii):
(i) one reciprocation in which the rolling reduction of a first pass is larger than the rolling reduction of a second pass by 15% or more;
(ii) one reciprocation in which the rolling reduction of a fourth pass is larger than the rolling reduction of a third pass by 15% or more; and
(iii) one reciprocation in which the rolling reductions of a fifth pass and a sixth pass are the same as the rolling reductions of the second pass of (i) and the third pass of (ii) respectively, and holding is performed for five seconds or longer after the rough rolling until finish rolling;
a finish rolling step of performing finish rolling on the rough-rolled steel sheet in a temperature range of 850° C. or higher and 1050° C. or lower, in which the finish rolling is performed by four or more continuous rolling stands, the rolling reduction of the first stand is 15% or more, and then the finish-rolled steel sheet is coiled;
a cold rolling step of cold-rolling the obtained hot-rolled steel sheet;
an annealing step of holding the obtained cold-rolled steel sheet in a temperature range of $Ac_1$ or higher and 1000° C. or lower for 10 seconds or longer and 1,000 seconds or shorter, and cooling the resultant to 450° C. or higher and 600° C. or lower at an average cooling rate of 2° C./sec or faster;
a plating step of performing hot-dip galvanizing on the obtained steel sheet so as to be subjected to an alloying treatment, and cooling the resultant to 100° C. or lower; and
a tempering step of holding the obtained steel sheet in a temperature range of 200° C. or higher and 350° C. or lower for 100 seconds or longer. In addition, "the rolling reduction of the first pass is larger than the rolling reduction of the second pass by 15% or more" means that the rolling reduction of the first pass is larger than the rolling reduction of the second pass, and the difference between the two is 15% or more, that is, the following formula is satisfied.

(rolling reduction of first pass(%))−(rolling reduction of second pass(%))≥15%

Similarly, "the rolling reduction of the fourth pass is larger than the rolling reduction of the third pass by 15% or more" means that the rolling reduction of the fourth pass is larger than the rolling reduction of the third pass, and the difference between the two is 15% or more, that is, the following formula is satisfied.

(Rolling reduction of fourth pass(%))−(rolling reduction of third pass(%))≥15%

Hereinafter, each step will be described.

(Step of Forming Slab)

First, a molten steel having the chemical composition of the steel sheet according to the embodiment of the present invention described above is cast to form a slab to be provided for rough rolling. The casting method may be an ordinary casting method, and a continuous casting method, an ingot-making method, or the like can be adopted. In terms of productivity, the continuous casting method is preferable.

(Rough Rolling Step)

The slab may be heated to a temperature range of 1000° C. or higher and 1300° C. or lower before performing the following rough rolling step. A heating retention time is not particularly specified, but it is preferable to hold the heating temperature for 30 minutes or longer in order to cause the central part of the slab to achieve a predetermined temperature. The heating retention time is preferably 10 hours or shorter and more preferably 5 hours or shorter in order to suppress excessive scale loss. When the temperature of the slab after casting is 1050° C. or higher and 1250° C. or lower, the slab may be subjected to rough rolling as it is without being heated and held in the temperature range, and may be subjected to hot direct rolling or direct rolled.

By performing rough rolling using only reverse rolling, it is possible to control a Mn segregation portion in the slab into a complicated shape without forming a plate shape stretched in one direction. Therefore, in a subsequent step, the formation of a plate-shaped structure is suppressed, and Mn is uniformly diffused, so that a DP steel containing a hard phase having a uniform hardness is obtained.

The formation of such a Mn segregation portion into a complicated shape will be described in more detail. First, in a slab before starting rough rolling, a plurality of portions where alloying elements such as Mn are concentrated grow substantially perpendicularly in a comb-like form from both surfaces toward the inside of the slab and are in a state of being arranged. On the other hand, in the rough rolling, the surface of the slab is stretched in a direction in which rolling proceeds in each rolling pass. The direction in which rolling proceeds is a direction in which the slab travels with respect to rolling rolls. As the surface of the slab is thus stretched in the direction in which rolling proceeds, the Mn segregation portion growing toward the inside from the surface of the slab is inclined in a traveling direction of the slab in each rolling pass.

In the case of so-called unidirectional rolling in which the direction in which the slab travels in each pass of the rough rolling is always the same direction, the inclination of the Mn segregation portion gradually increases in the same direction in each pass while the Mn segregation portion maintains a substantially straight state. At the end of the rough rolling, the Mn segregation portion is in a posture substantially parallel to the surface of the slab while maintaining a substantially straight state, and flat microsegregation is formed.

On the other hand, in the case of reverse rolling in which the directions in which the slab travels in the respective passes of the rough rolling alternately become opposite directions, the Mn segregation portion inclined in the immediately preceding pass is inclined in the reverse direction in the subsequent pass, and as a result, the Mn segregation portion has a bent shape. Therefore, in the reverse rolling, passes alternately performed in opposite directions are repeatedly performed, whereby the Mn segregation portion has a complicatedly bent shape.

When the temperature of the rough rolling is lower than 1050° C., it is difficult to complete the rolling at a temperature of 850° C. or higher in the subsequent finish rolling step, and the shape of the steel sheet becomes defective. When the temperature exceeds 1250° C., scale loss during slab preheating increases, which causes slab cracking. Therefore, the temperature of the rough rolling is set to 1050° C. or higher and 1250° C. or lower.

When the rolling reduction of one pass in the rough rolling exceeds 35%, the shear stress during the rolling increases, so that the interval between the Mn segregation portions becomes wide, and Mn cannot be diffused in a subsequent heat treatment step, more specifically, the finish rolling step and annealing step. Therefore, the rolling reduction of one pass in the rough rolling is set to 35 or less. The rolling reduction of one pass in the rough rolling is preferably 30% or less, or 25% or less. The smaller the rolling reduction, the smaller the shear strain at the time of rolling, and the formation of Mn segregation is suppressed. Therefore, although the lower limit of the rolling reduction is not particularly specified, the lower limit of the rolling reduction is preferably 5% or more, from the viewpoint of productivity.

In the manufacturing method of the galvannealed steel sheet according to the present embodiment, by controlling the rolling reduction of each pass and controlling the magnitude of the shear stress, the Mn segregation portion is made into a complicated shape and Mn is diffused. Specifically, the Mn segregation portion is made into a more complicated shape by repeating reciprocations of reverse rolling with different rolling reductions twice. By performing a large reduction in a traveling direction in the first pass in which a rolling temperature is high, the Mn segregation is greatly inclined in the same direction as the traveling direction, and by performing a large reduction again in the fourth pass in which the rolling temperature is lowered, the Mn segregation portion is greatly inclined in the opposite direction to the traveling direction. In order to form a complicatedly bent shape of the Mn segregation portion, it is preferable that the rolling reduction difference in one reciprocation of reverse rolling is set to 15% or more. Therefore, the rolling reduction of the second pass is made lower than the rolling reduction of the first pass by 15% or more, and the rolling reduction of the third pass is made lower than the rolling reduction of the fourth pass by 15% or more.

The upper limit of the rolling reduction difference in one reciprocation of reverse rolling is not particularly set. However, since the rolling reduction of one pass of the rough rolling reduction is preferably 5% or more and 35% or less, the upper limit thereof does not actually exceed 30%. Therefore, the upper limit of the rolling reduction difference in one reciprocation of reverse rolling is preferably 30% or less.

In the present application, as the reverse rolling, two or more sets of rolling (six reciprocations) with a total of six passes (three reciprocations) of the following (i) to (iii) as one set, including:

(i) one reciprocation in which the rolling reduction of the first pass is larger than the rolling reduction of the second pass by 15% or more;

(ii) one reciprocation in which the rolling reduction of the fourth pass is larger than the rolling reduction of the third pass by 15% or more; and (iii) one reciprocation in which the rolling reductions of the fifth pass and the sixth pass are the same as the rolling reductions of the second pass of (i) and the third pass of (ii), respectively.

However, when the above rolling is performed four times or more, that is, 12 reciprocations or more, it becomes difficult to secure a sufficient finish rolling temperature. Therefore, it is preferable that the rolling is performed three times or less, that is, nine reciprocations or less.

Furthermore, it is desirable that passes of which the traveling directions are opposite to each other are performed the same number of times, that is, the total number of passes is an even number. However, in a general rough rolling line, the inlet side and the outlet side of the rough rolling are located on opposite sides with rolls therebetween. Therefore, the number of passes (rolling) in the direction from the inlet side to the outlet side of the rough rolling is larger by one. Then, in the last pass (rolling), the Mn segregation portion has a flat shape and is less likely to form a complicated structure. In a case where rough rolling is performed on such a hot rolling line, it is preferable that rolling is omitted by opening the rolls in the last pass.

In order to cause the intricate structure of Mn generated by the reverse rolling in the rough rolling to be uniform by austenite grain boundary migration, it is preferable that holding is performed between the rough rolling and the finish rolling for 5 seconds or longer.

(Finish Rolling Step)

After the reverse rolling in the rough rolling, in order to narrow the spacing of Mn segregation zones caused by secondary dendrite arms by increasing the rolling reduction of the tandem rolling in the finish rolling, the finish rolling is preferably performed by four or more continuous rolling stands. When the finish rolling is completed at lower than 850° C., recrystallization does not sufficiently occur, a structure elongated in the rolling direction is formed, and a plate-like structure due to the elongated structure is generated in a subsequent step. Therefore, a finish rolling completion temperature is set to 850° C. or higher. On the other hand, when the finish rolling temperature exceeds 1050° C., it becomes difficult to generate fine austenite recrystallized grains, Mn segregation at grain boundaries becomes difficult, and the Mn segregation zones are likely to be flat. Therefore, the finish rolling temperature is set to 1050° C. or lower. As necessary, the steel sheet subjected to the rough rolling may be reheated after the rough rolling step and before the finish rolling step. Furthermore, when the rolling reduction of the first stand of the finish rolling is set to 15% or more, a large amount of recrystallized grains are generated, and Mn is likely to be uniformly dispersed by the subsequent grain boundary migration. As described above, by limiting not only the rough rolling step but also the finish rolling step, it is possible to suppress the flat Mn microsegregation.

A coiling temperature of the hot-rolled steel sheet in the finish rolling is preferably 700° C. or lower. When the hot-rolled steel sheet is coiled at a temperature higher than 700° C., coarse carbides are precipitated in the structure of the hot-rolled steel sheet, and Mn concentration occurs while the hot-rolled steel sheet is cooled to room temperature, so that the complicated shape of the Mn segregation portion impaired. Furthermore, in the above case, the thickness of oxides formed on the surface of the hot-rolled steel sheet is excessively increased, and a pickling property is lowered. Therefore, the coiling temperature is preferably set to 700° C. or lower.

(Cold Rolling Step)

A cold rolling method is not particularly limited, and an ordinary method can be adopted. For example, cold rolling is performed after pickling of the hot-rolled steel sheet. In the cold rolling step, the rolling reduction of the cold rolling is preferably set to 50% or more from the viewpoint of homogenization and/or refinement the structure. The pickling may be ordinary pickling.

(Annealing Step)

The steel sheet obtained through the cold rolling step is subjected to an annealing treatment. Heating at an annealing temperature is performed and held in a temperature range of $Ac_1$ or higher and 1000° C. or lower for 10 seconds or longer and 1000 seconds or shorter. This temperature range determines the area ratios of ferrite and the hard structure. When the annealing temperature is lower than $Ac_1$, austenite is not generated and a hard structure is not generated. On the other hand, when the annealing temperature exceeds 1000° C., an austenite particle size becomes coarse and toughness decreases. Therefore, the annealing temperature is set to $Ac_1$ or higher and 1000° C. or lower.

The $Ac_1$ point is calculated by the following formula.

$$Ac_1 = 751 - 16 \times C + 35 \times Si - 28 \times Mn - 16 \times Ni + 13 \times Cr - 6 \times Cu + 3 \times Mo$$

In the above formula, C, Si, Mn, Ni, Cr, Cu, and Mo are the amounts (mass %) of the corresponding elements, and 0 mass % is substituted into the elements that are not contained.

An annealing time is necessary to sufficiently recrystallize cold-worked ferrite and to control the area ratios of ferrite and the hard structure. When the annealing time is shorter than 10 seconds, the area ratio of austenite is not sufficient and a hard structure is not generated. On the other hand, when the annealing time exceeds 1000 seconds, the productivity deteriorates. Therefore, the annealing time is set to 10 seconds or longer and 1000 seconds or shorter.

After holding the annealing temperature, primary cooling to 450° C. or higher and 600° C. or lower until plating is performed at an average cooling rate of 2° C./sec or faster. Here, the average cooling rate is the average rate from the time when holding of the steel sheet temperature in the annealing is ended to the time when the steel sheet is immersed in a plating bath. That is, the average cooling rate in the primary cooling is a value calculated by the following formula.

(average cooling rate)={(steel sheet temperature at the end of holding of temperature in annealing step)−(steel sheet temperature at the time of immersion in plating step)}/(time required from the end of holding of temperature in annealing step to the start of immersion in plating step)

In order to freeze the structure and cause the martensitic transformation to efficiently occur, the average cooling rate may be fast. However, at a cooling rate of slower than 2° C./sec, martensite is not sufficiently generated, and the structure cannot be controlled into a desired structure. Therefore, the average cooling rate after annealing is set to 2° C./sec or faster. A cooling stop temperature is set to 450° C. or higher and 600° C. or lower. In a case where the cooling stop temperature is lower than 450° C., when the steel sheet is subsequently immersed in the plating bath, the plating bath temperature drops and the productivity is poor. On the other hand, in a case where the cooling stop temperature exceeds 600° C., a hard structure is not sufficiently generated and a desired structure area ratio cannot be obtained. Therefore, the cooling stop temperature is set to 450° C. or higher and 600° C. or lower.

(Plating Step)

The obtained steel sheet is subjected to hot-dip galvanizing, and further subjected to an alloying treatment by being heated to a temperature required for alloying the plating. The hot-dip galvanizing bath composition may be a general composition, for example, a hot-dip galvanizing bath having an Al content of 0.08 to 0.30 mass % or more. A plating adhesion amount is not particularly limited. For example, the plating adhesion amount is within a range of 30 to 90 g/m² per surface. It is desirable that the alloying treatment is performed under conditions such that the Fe concentration in the plating layer is 7 mass % or more. Necessary conditions vary depending on the plating adhesion amount. However, for example, the alloying treatment is performed by heating in a temperature range of 480° C. or higher and 580° C. or lower for a time of one second or longer and 50 seconds or shorter.

Then, cooling to 100° C. or lower is performed. When the cooling stop temperature exceeds 100° C., carbides are generated at the grain boundaries, the structure becomes non-uniform, and the ultimate deformability after bake hardening decreases. Therefore, cooling from an alloying treatment temperature is performed to 100° C. or lower.

(Tempering Step)

The obtained steel sheet is held in a temperature range of 200° C. or higher and 350° C. or lower by heating in the tempering step. A holding temperature is preferably set to 250° C. or higher and 300° C. or lower. In a case where the holding temperature is lower than 200° C., the hard structure is not tempered and the distribution of prestrain does not change. In addition, it takes time to complete the tempering, resulting in poor productivity. In a case where the holding temperature exceeds 350° C., the total amount of solid solution carbon is reduced, resulting in a reduction in the bake hardenability. In addition, the carbides at the grain boundaries become coarse, and the ultimate deformability after bake hardening also decreases. When a retention time is shorter than 100 seconds, the tempering of the structure cannot be completed. Therefore, the retention time is set to 100 seconds or longer. Thereafter, from the viewpoint of productivity, cooling to 100° C. or lower is performed at an average cooling rate of 2° C./sec or faster.

(Skin Pass Rolling Step)

After the tempering step, skin pass rolling (temper rolling) may be optionally performed. By performing skin pass rolling, strain is applied to the steel sheet even if there is no prestrain, so that the bake hardenability can be improved. In order to uniformly introduce the strain into the steel sheet, for example, a rolling reduction is preferably set to 0.1% or more and 0.5% or less.

In this manner, the galvannealed steel sheet according to the embodiment of the present invention can be manufactured.

It should be noted that each of the above-described embodiments is merely an example of an embodiment for carrying out the present invention, and the technical scope of the present invention should not be construed as being limited by these embodiments. That is, the present invention can be implemented in various forms without departing from the technical idea or the main features thereof.

EXAMPLES

Next, examples of the present invention will be described. The conditions in the examples are one example of conditions adopted to confirm the feasibility and effects of the present invention, and the present invention is not limited to this one example of conditions. The present invention can adopt various conditions as long as the object of the present invention is achieved without departing from the gist of the present invention.

A slab having the chemical composition shown in Table 1 was manufactured, the slab was heated to 1300° C. for one hour, and thereafter subjected to rough rolling and finish rolling under the conditions shown in Table 2, and the steel sheet was then coiled and held at the coiling temperature shown in Table 2 to obtain a hot-rolled steel sheet. Thereafter, the hot-rolled steel sheet was pickled and cold-rolled at the rolling reduction shown in Table 2 to obtain a cold-rolled steel sheet having a sheet thickness of 1.2 mm. Subsequently, annealing, plating, tempering, and skin pass rolling were performed under the conditions shown in Table 2. In some cases, the number of passes in the rough rolling was four. Regarding the example in which the number of passes was four (that is, the rolling reductions of the fifth pass and the sixth pass was 0%), in the columns of "Rolling reduction of second pass and fifth pass" and "Rolling reduction of third pass and sixth pass" are shown in Table 2-1, "Rolling reduction of second pass" and "Rolling reduction of third pass" are respectively written.

TABLE 1

| Kind of Steel | Chemical Composition (mass %) | | | | | | | | | | | | | | | | | |
|---|---|---|---|---|---|---|---|---|---|---|---|---|---|---|---|---|---|---|
| | C | Si | Mn | P | S | Al | N | Ti | Nb | V | Cu | Ni | Mo | Cr | W | Ca | Mg | REM | B |
| A | 0.10 | 1.000 | 2.20 | 0.010 | 0.004 | 0.020 | 0.003 | | | | | | | | | | | | |
| B | 0.13 | 1.000 | 2.20 | 0.011 | 0.004 | 0.020 | 0.003 | 0.030 | | | | | | | | | | | |
| C | 0.15 | 0.900 | 2.90 | 0.012 | 0.004 | 0.020 | 0.003 | | | | | 0.010 | | | | | | | |
| D | 0.11 | 0.800 | 3.00 | 0.011 | 0.004 | 0.020 | 0.003 | | | | | | 0.005 | | | | | | |
| E | 0.20 | 1.200 | 2.10 | 0.010 | 0.004 | 0.020 | 0.003 | | | | 0.010 | | | | | | | | |
| F | 0.20 | 1.200 | 2.00 | 0.010 | 0.004 | 0.020 | 0.003 | | | 0.004 | | | | | | | | | |
| G | 0.01 | 1.000 | 2.50 | 0.012 | 0.004 | 0.020 | 0.003 | | | | | | | | | | | | |
| H | 0.15 | 0.003 | 2.40 | 0.011 | 0.003 | 0.020 | 0.003 | | | | | | | | | | | | |
| I | 0.14 | 0.500 | 2.40 | 0.013 | 0.003 | 0.020 | 0.003 | 0.005 | 0.005 | | | | | | | | | | |
| J | 0.18 | 1.800 | 2.60 | 0.010 | 0.004 | 0.020 | 0.003 | | | | | | | 0.003 | | | | | |
| K | 0.16 | 1.800 | 0.05 | 0.009 | 0.003 | 0.020 | 0.003 | | | | | | | | | | | | |
| L | 0.14 | 0.900 | 2.20 | 0.013 | 0.003 | 0.020 | 0.003 | | | | | | 0.007 | | | | | | |
| M | 0.13 | 1.100 | 2.20 | 0.012 | 0.004 | 0.020 | 0.003 | | | | | | | | 0.005 | | | | |
| N | 0.23 | 1.000 | 2.40 | 0.009 | 0.004 | 0.020 | 0.003 | | | | | | | | | | | | |
| O | 0.09 | 1.000 | 2.20 | 0.012 | 0.004 | 0.020 | 0.003 | | | | | | | | | 0.004 | 0.009 | | |
| P | 0.13 | 1.000 | 2.30 | 0.011 | 0.004 | 0.020 | 0.003 | | | | | | | | | | | | 0.0019 |
| Q | 0.07 | 0.800 | 2.20 | 0.010 | 0.004 | 0.020 | 0.003 | | | | | | | | | | | | |
| R | 0.07 | 0.800 | 2.20 | 0.030 | 0.004 | 0.020 | 0.003 | | | | | | | | | | | | |

TABLE 1-continued

| Kind of Steel | Chemical Composition (mass %) | | | | | | | | | | | | | | | | | | |
|---|---|---|---|---|---|---|---|---|---|---|---|---|---|---|---|---|---|---|---|
| | C | Si | Mn | P | S | Al | N | Ti | Nb | V | Cu | Ni | Mo | Cr | W | Ca | Mg | REM | B |
| S | 0.27 | 0.300 | 2.00 | 0.010 | 0.007 | 0.030 | 0.003 | | | | | | | | | | | | |
| T | 0.06 | 0.450 | 3.70 | 0.020 | 0.007 | 0.030 | 0.003 | | | | | | | | | | | | |

*Underline indicates that it is outside the scope of the present invention.
*Blanks in the table indicate that the corresponding chemical component was not intentionally added.

TABLE 2-1

| No. | Kind of Steel | Rough Rolling | | | | | | |
|---|---|---|---|---|---|---|---|---|
| | | Heating Temperature (° C.) | Rolling Reduction of first pass (%) | Rolling Reduction of second pass and fifth pass (%) | Rolling Reduction of third pass and sixth pass (%) | Rolling Reduction of fourth pass (%) | Number of Reciprocations of Rough Rolling (reciprocation) | Rough Rolling Start Temperature (° C.) |
| 1 | A | 1300 | 30 | 10 | 15 | 35 | 6 | 1250 |
| 2 | A | 1300 | 25 | 10 | 10 | 25 | 6 | 1200 |
| 3 | B | 1300 | 30 | 10 | 10 | 30 | 6 | 1200 |
| 4 | C | 1300 | 25 | 5 | 10 | 25 | 6 | 1200 |
| 5 | D | 1300 | 30 | 10 | 5 | 25 | 6 | 1200 |
| 6 | E | 1300 | 35 | 15 | 10 | 25 | 6 | 1200 |
| 7 | E | 1300 | 25 | 10 | 10 | 30 | 6 | 1250 |
| 8 | E | 1300 | 30 | 10 | 5 | 25 | 6 | 1250 |
| 9 | F | 1300 | 25 | 10 | 10 | 30 | 6 | 1200 |
| 10 | F | 1300 | 25 | 5 | <u>15</u> | <u>25</u> | 6 | 1200 |
| 11 | F | 1300 | 30 | 10 | <u>10</u> | <u>25</u> | 6 | 1200 |
| 12 | G | 1300 | 35 | 10 | 10 | 25 | 6 | 1250 |
| 13 | H | 1300 | 25 | 5 | 10 | 30 | 6 | 1200 |
| 14 | I | 1300 | 30 | 10 | 5 | 25 | 6 | 1200 |
| 15 | I | 1300 | 25 | 10 | 10 | 25 | 4 | 1200 |
| 16 | J | 1300 | 30 | 5 | 10 | 25 | 6 | 1200 |
| 17 | K | 1300 | 35 | 10 | 10 | 30 | 6 | 1200 |
| 18 | L | 1300 | 25 | 10 | 10 | 35 | 6 | 1200 |
| 19 | M | 1300 | 35 | 10 | 5 | 30 | 6 | 1200 |
| 20 | N | 1300 | 25 | 10 | 10 | 30 | 6 | 1200 |
| 21 | O | 1300 | 25 | 10 | 5 | 35 | 6 | 1200 |
| 22 | P | 1300 | 30 | 10 | 10 | 25 | 6 | 1250 |
| 23 | P | 1300 | 35 | 10 | 10 | 30 | 6 | 1250 |
| 24 | P | 1300 | 25 | 5 | 5 | 30 | 6 | 1250 |
| 25 | Q | 1300 | 25 | 10 | 10 | 30 | 6 | 1200 |
| 26 | Q | 1300 | 30 | 15 | 10 | 35 | 6 | 1250 |
| 27 | Q | 1300 | 35 | <u>25</u> | 20 | <u>15</u> | 6 | 1250 |
| 28 | Q | 1300 | <u>35</u> | <u>10</u> | <u>10</u> | <u>30</u> | 6 | 1250 |
| 29 | E | 1300 | 30 | 10 | 5 | 25 | 6 | 1250 |
| 30 | A | 1300 | <u>10</u> | 30 | 15 | 35 | 6 | 1250 |
| 31 | A | 1300 | <u>30</u> | <u>10</u> | <u>35</u> | <u>15</u> | 6 | 1250 |
| 32 | A | 1300 | <u>40</u> | 10 | <u>15</u> | <u>40</u> | 6 | 1250 |
| 33 | A | 1300 | <u>35</u> | 10 | 10 | <u>30</u> | 6 | 1250 |
| 34 | R | 1300 | 30 | 10 | 15 | 35 | 6 | 1250 |
| 35 | S | 1300 | 35 | 10 | 10 | 30 | 6 | 1250 |
| 36 | T | 1300 | 35 | 10 | 10 | 30 | 6 | 1250 |

| No. | Rough Rolling | | Finish Rolling | | | | |
|---|---|---|---|---|---|---|---|
| | Rough Rolling Completion Temperature (° C.) | Time from Rough Rolling to Finish Rolling (s) | Number of Rolling Stand (number) | Finish Rolling Start Temperature (° C.) | Rolling Reduction of First Stand (%) | Finish Rolling Completion Temperature (° C.) | Coiling Temperature (° C.) |
| 1 | 1100 | 8 | 7 | 1050 | 20 | 900 | 650 |
| 2 | 1100 | 8 | 7 | 1050 | 20 | 900 | 650 |
| 3 | 1100 | 8 | 7 | 1050 | 20 | 900 | 600 |
| 4 | 1100 | 8 | 7 | 1050 | 20 | 900 | 650 |
| 5 | 1100 | 8 | 7 | 1050 | 20 | 900 | 640 |
| 6 | 1050 | 8 | 7 | 1050 | 20 | 850 | 600 |
| 7 | 1100 | 8 | 7 | 1050 | 20 | 900 | 620 |
| 8 | 1100 | 8 | 7 | 1050 | 20 | 900 | 620 |
| 9 | 1100 | 8 | 7 | 1050 | 20 | 900 | 640 |
| 10 | 1100 | 8 | 7 | 1050 | 20 | 900 | 600 |
| 11 | 1100 | 8 | 7 | 1050 | 20 | 900 | 650 |
| 12 | 1100 | 8 | 7 | 1050 | 20 | 900 | 650 |
| 13 | 1100 | 8 | 7 | 1050 | 20 | 850 | 650 |

TABLE 2-1-continued

| No. | | | | | | | |
|---|---|---|---|---|---|---|---|
| 14 | 1100 | 8 | 7 | 1050 | 20 | 900 | 650 |
| 15 | 1100 | 8 | 7 | 1050 | 20 | 850 | 650 |
| 16 | 1100 | 8 | 7 | 1050 | 20 | 900 | 670 |
| 17 | 1100 | 8 | 7 | 1050 | 20 | 900 | 660 |
| 18 | 1100 | 8 | 7 | 1050 | 20 | 900 | 670 |
| 19 | 1100 | 8 | 7 | 1050 | 20 | 850 | 650 |
| 20 | 1100 | 8 | 7 | 1050 | 20 | 900 | 640 |
| 21 | 1100 | 8 | 7 | 1050 | 20 | 900 | 630 |
| 22 | 1100 | 8 | 7 | 1050 | 20 | 900 | 640 |
| 23 | 1100 | 8 | 7 | 1050 | 20 | 900 | 640 |
| 24 | 1100 | 8 | 7 | 1050 | 20 | 900 | 650 |
| 25 | 1100 | 8 | 7 | 1050 | 20 | 900 | 640 |
| 26 | 1100 | 8 | 7 | 1050 | 20 | 900 | 640 |
| 27 | 1100 | 8 | 7 | 1050 | 20 | 900 | 640 |
| 28 | 1100 | <u>3</u> | 7 | 1050 | 20 | 900 | 650 |
| 29 | 1100 | 8 | 7 | 1050 | 20 | 900 | 640 |
| 30 | 1100 | 8 | 7 | 1050 | 20 | 900 | 640 |
| 31 | 1100 | 8 | 7 | 1050 | 20 | 900 | 650 |
| 32 | 1100 | 8 | 7 | 1050 | 20 | 900 | 650 |
| 33 | 1100 | 8 | 7 | 1050 | 20 | 900 | <u>750</u> |
| 34 | 1100 | 8 | 7 | 1050 | 20 | 900 | 640 |
| 35 | 1100 | 8 | 7 | 1050 | 20 | 900 | 640 |
| 36 | 1100 | 8 | 7 | 1050 | 20 | 900 | 640 |

*Underline indicates that it is out of the preferable range.

TABLE 2-2

| | Cold Rolling Rolling Reduction (%) | Annealing | | | | | Plating | |
|---|---|---|---|---|---|---|---|---|
| No. | | $Ac_1$ (° C.) | Annealing Temperature (° C.) | Annealing Time (s) | Average Cooling Rate (° C./s) | Cooling Stop Temperature (° C.) | Alloying Treatment Temperature (° C.) | Alloying Treatment Time (s) |
| 1 | 55 | 723 | 850 | 300 | 50 | 450 | 500 | 20 |
| 2 | 65 | 723 | 900 | 200 | 20 | 460 | 550 | 20 |
| 3 | 65 | 722 | 780 | 200 | 5 | 450 | 500 | 20 |
| 4 | 65 | 699 | 800 | 200 | 5 | 450 | 500 | 20 |
| 5 | 65 | 693 | 750 | 200 | 10 | 450 | 500 | 20 |
| 6 | 55 | 731 | 810 | 200 | 10 | 460 | 500 | 20 |
| 7 | 55 | 731 | <u>650</u> | 200 | 50 | 450 | 500 | 20 |
| 8 | 60 | 731 | <u>740</u> | <u>5</u> | 50 | 470 | 500 | 20 |
| 9 | 60 | 734 | 810 | 200 | 50 | 450 | 500 | 20 |
| 10 | 60 | 734 | 810 | 200 | <u>0.5</u> | 460 | 500 | 20 |
| 11 | 60 | 734 | 810 | 200 | <u>50</u> | 470 | 500 | 20 |
| 12 | 65 | 716 | 750 | 200 | 50 | 450 | 500 | 20 |
| 13 | 65 | 682 | 820 | 200 | 5 | 460 | 500 | 20 |
| 14 | 50 | 699 | 800 | 200 | 10 | 450 | 500 | 20 |
| 15 | 55 | 699 | 800 | 200 | 10 | 450 | 500 | 20 |
| 16 | 60 | 738 | 780 | 200 | 15 | 450 | 500 | 20 |
| 17 | 50 | 810 | 850 | 200 | 10 | 460 | 550 | 20 |
| 18 | 60 | 719 | 850 | 250 | 50 | 450 | 500 | 20 |
| 19 | 50 | 726 | 800 | 200 | 50 | 450 | 500 | 20 |
| 20 | 55 | 715 | 800 | 200 | 50 | 450 | 500 | 20 |
| 21 | 60 | 723 | 780 | 200 | 50 | 450 | 500 | 20 |
| 22 | 50 | 720 | 850 | 200 | 50 | 550 | 500 | 20 |
| 23 | 55 | 720 | 790 | 200 | 2 | <u>750</u> | 500 | 20 |
| 24 | 60 | 720 | 850 | 200 | 10 | <u>450</u> | 500 | 20 |
| 25 | 50 | 716 | 850 | 200 | 100 | 450 | 500 | 20 |
| 26 | 50 | 716 | 850 | 200 | 100 | 450 | 500 | 20 |
| 27 | 50 | 716 | 850 | 200 | 100 | 450 | 500 | 20 |
| 28 | 55 | 716 | 850 | 200 | 50 | 450 | 530 | 20 |
| 29 | 50 | 731 | 810 | 200 | 10 | 450 | <u>none</u> | |
| 30 | 50 | 723 | 850 | 200 | 100 | 450 | 500 | 20 |
| 31 | 55 | 723 | 850 | 200 | 50 | 450 | 530 | 20 |
| 32 | 55 | 723 | 850 | 300 | 50 | 450 | 500 | 20 |
| 33 | 55 | 723 | 850 | 200 | 50 | 450 | 530 | 20 |
| 34 | 50 | 716 | 850 | 200 | 100 | 450 | 500 | 20 |
| 35 | 50 | 701 | 850 | 200 | 100 | 450 | 500 | 20 |
| 36 | 55 | 662 | 850 | 200 | 50 | 450 | 530 | 20 |

TABLE 2-2-continued

| | | Tempering | | | | Skin Pass |
|---|---|---|---|---|---|---|
| No. | Plating Cooling Stop Temperature (° C.) | Tempering Retention Temperature (° C.) | Tempering Retention Time (s) | Cooling Rate (° C./s) | Cooling Stop Temperature (° C.) | Rolling Rolling Reduction (%) |
| 1 | 45 | 250 | 600 | 5 | 50 | 0.2 |
| 2 | 40 | 300 | <u>5</u> | 5 | 45 | 0.2 |
| 3 | 50 | 250 | 600 | 5 | 45 | 0.2 |
| 4 | 45 | <u>100</u> | 600 | 5 | 45 | 0.2 |
| 5 | 45 | <u>250</u> | 600 | 5 | 50 | 0.2 |
| 6 | 45 | 300 | 600 | 5 | 50 | 0.2 |
| 7 | 50 | 350 | 600 | 5 | 45 | 0.2 |
| 8 | 50 | 250 | 600 | 5 | 40 | 0.2 |
| 9 | 45 | 300 | 600 | 5 | 40 | 0.2 |
| 10 | 40 | 250 | 600 | 5 | 50 | 0.2 |
| 11 | 40 | <u>500</u> | 600 | 5 | 45 | 0.2 |
| 12 | 50 | <u>250</u> | 600 | 5 | 50 | 0.2 |
| 13 | 45 | 300 | 600 | 5 | 45 | 0.2 |
| 14 | 50 | 250 | 600 | 5 | 50 | 0.2 |
| 15 | 45 | 300 | 600 | 5 | 45 | 0.2 |
| 16 | 50 | 300 | 600 | 5 | 40 | 0.2 |
| 17 | 45 | 300 | 600 | 5 | 45 | 0.2 |
| 18 | 40 | 250 | 600 | 5 | 45 | 0.2 |
| 19 | 45 | 250 | 600 | 5 | 40 | 0.2 |
| 20 | 40 | 300 | 600 | 5 | 50 | 0.2 |
| 21 | 50 | 300 | 600 | 5 | 45 | 0.2 |
| 22 | 55 | 250 | 600 | 5 | 45 | 0.2 |
| 23 | 55 | 250 | 600 | 5 | 40 | 0.2 |
| 24 | 45 | | <u>none</u> | | | 0.2 |
| 25 | <u>350</u> | 300 | 600 | 5 | 40 | 0.2 |
| 26 | <u>45</u> | 300 | 600 | 5 | 40 | 0.2 |
| 27 | 45 | 300 | 600 | 5 | 40 | 0.2 |
| 28 | 50 | 300 | 600 | 4 | 45 | 0.2 |
| 29 | <u>none</u> | 300 | 600 | 5 | 40 | 0.2 |
| 30 | <u>45</u> | 300 | 600 | 5 | 40 | 0.2 |
| 31 | 50 | 300 | 600 | 4 | 45 | 0.2 |
| 32 | 45 | 250 | 600 | 5 | 50 | 0.2 |
| 33 | 50 | 300 | 600 | 4 | 45 | 0.2 |
| 34 | 45 | 300 | 600 | 5 | 40 | 0.2 |
| 35 | 45 | 300 | 600 | 5 | 40 | 0.2 |
| 36 | 50 | 300 | 600 | 4 | 45 | 0.2 |

*Underline indicates that it is out of the preferable range.

The steel structure of the obtained galvannealed steel sheet was observed, the area ratios of ferrite and the hard structure (tempered martensite and tempered bainite), the precipitation points and number density of carbides having a major axis of 50 nm to 200 nm, and the two-dimensional homogeneous dispersion ratio S were measured.

Specifically, the area ratio of ferrite and the area ratio of hard structure were determined as follows. First, a sample was taken with a sheet thickness cross section perpendicular to the rolling direction of the steel sheet as an observed section, the observed section was polished, the structure thereof at a thickness ¼ position of the steel sheet was observed with SEM-EBSD at a magnification of 5,000-fold, the resultant was subjected to image analysis in a visual field of 100 μm×100 m to measure the area ratio of ferrite, and the average of values measured at any five visual fields was determined as the area ratio of ferrite.

Furthermore, an SEM secondary electron image of a region at a depth from 3 t/8 to t/2 from the surface of the steel sheet was photographed (at a magnification 1,500-fold), and from the fact that white portions of the obtained image data are hard structures and black portions are ferrite, the area ratio of the hard structures was determined based on the image data. The hard structure was determined to be tempered in a case where fine carbides were precipitated in the hard structure when the SEM secondary electron image was observed at 5,000-fold or 10,000-fold.

The major axis and number density of carbides were measured by TEM observation. Specifically, a thin film sample was cut out from a region between a ⅜ position and a ¼ position of the thickness of the steel sheet from the surface of the steel sheet, and was observed in a bright visual field. The sample was cut by 1 μm² at an appropriate magnification between 10,000-fold and 100,000-fold, and carbides having a major axis of 50 nm or more and 300 nm or less among the carbides in the visual field were counted and obtained. This operation was performed in five consecutive visual fields, and the average was taken as the number density.

In addition, the two-dimensional homogeneous dispersion ratio represented by S was obtained by an EPMA device. The results are shown in Table 3.

Furthermore, the tensile strength TS, fracture elongation EL, bake hardening amount BH, and sheet thickness reduction ratio TDR after bake hardening of the obtained galvannealed steel sheet were measured. The sheet thickness reduction ratio TDR after bake hardening is an index of the ultimate deformability. In the measurement of the tensile strength TS, fracture elongation EL, bake hardening amount BH, and sheet thickness reduction ratio TDR after bake hardening, JIS No. 5 tensile test pieces whose longitudinal direction was perpendicular to the rolling direction were taken, and a tensile test was conducted according to JIS Z 2241. BH is a value obtained by subtracting the stress at the time of application of 2% prestrain from the stress when a test piece subjected to a heat treatment at 170° C. for 20 minutes is re-tensioned after the application of 2% prestrain. TDR is a value obtained by dividing the difference between the original sheet thickness and the sheet thickness after fracture by the original sheet thickness. In order to satisfy the demand for a reduction in the weight of a vehicle body, the tensile strength is 600 MPa or more, preferably 700 MPa or more, and more preferably 800 MPa. Furthermore, the fracture elongation is preferably 10% or more for facilitating forming. In addition, regarding BH, with a BH of less than 100 MPa, it is difficult to perform forming and the strength after forming becomes low. Therefore, a BH of 100 MPa or more is required to provide excellent bake hardenability. BH is more preferably 120 MPa or more. When TDR is less than 25%, there is a risk of cracking during press forming, so that a TDR of 30% or more is required. TDR is more preferably 40%.

be obtained. In any of the examples, TS was 600 MPa or more, BH was 100 MPa or more, and TDR was 30% or more, which showed that the strength was high, the bake hardenability was excellent, and the ultimate deformability after bake hardening was also excellent.

On the other hand, in Comparative Example 2, since the tempering retention time was too short, the hard structure was not tempered, the number density of carbides in the ferrite grains was low, and BH and TDR were low.

In Comparative Example 4, since the tempering temperature was too low, the hard structure was not tempered, the number density of carbides in the ferrite grains was low, and BH and TDR were low.

In Comparative Example 7, since the annealing temperature was too low, ferrite and the hard structure did not have the desired area ratios, and TS and BH were low.

TABLE 3

| | Mechanical Property Value | | | | A Area Ratio of Ferrite (%) | B Tempered Martensite + Tempered Bainite (%) | A + B (%) | Precipitation Points of Carbides | Number Density of Carbides in Grains (number/μm$^2$) | Two-dimensional Homogeneous Dispersion Ratio S | Note |
|---|---|---|---|---|---|---|---|---|---|---|---|
| No. | TS (MPa) | EL (%) | BH (MPa) | TDR (%) | | | | | | | |
| 1 | 947 | 20 | 120 | 35 | 26 | 73 | 99 | in grain | 25 | 1.10 | Example |
| 2 | 1032 | 15 | 87 | 20 | 35 | 9 | 44 | in grain | 5 | 1.13 | Comparative example |
| 3 | 631 | 27 | 104 | 55 | 77 | 21 | 98 | in grain | 28 | 0.95 | Example |
| 4 | 1164 | 13 | 75 | 15 | 48 | 5 | 53 | in grain | 2 | 1.09 | Comparative example |
| 5 | 1157 | 11 | 132 | 30 | 37 | 60 | 97 | in grain | 26 | 1.21 | Example |
| 6 | 705 | 23 | 128 | 45 | 58 | 37 | 95 | in grain | 35 | 1.17 | Example |
| 7 | 469 | 32 | 45 | 55 | 98 | 0 | 98 | in grain | 27 | 1.04 | Comparative example |
| 8 | 587 | 28 | 56 | 60 | 93 | 0 | 93 | in grain | 34 | 1.09 | Comparative example |
| 9 | 1038 | 19 | 118 | 45 | 21 | 79 | 100 | in grain | 38 | 1.11 | Example |
| 10 | 545 | 28 | 49 | 25 | 87 | 12 | 99 | at grain boundary | 0 | 1.15 | Comparative example |
| 11 | 848 | 22 | 87 | 25 | 53 | 44 | 97 | at grain boundary | 0 | 1.19 | Comparative example |
| 12 | 492 | 30 | 57 | 60 | 100 | 0 | 100 | in grain | 2 | 1.01 | Comparative example |
| 13 | 1199 | 11 | 89 | 10 | 23 | 77 | 100 | at grain boundary | 0 | 1.30 | Comparative example |
| 14 | 1013 | 25 | 109 | 30 | 36 | 63 | 99 | in grain | 29 | 1.04 | Example |
| 15 | 1019 | 25 | 78 | 25 | 34 | 65 | 99 | in grain | 30 | 1.55 | Comparative example |
| 16 | 811 | 21 | 104 | 55 | 72 | 27 | 99 | in grain | 25 | 1.30 | Example |
| 17 | 569 | 28 | 81 | 60 | 91 | 8 | 99 | in grain | 21 | 1.21 | Comparative example |
| 18 | 925 | 18 | 122 | 35 | 35 | 65 | 100 | in grain | 28 | 1.13 | Example |
| 19 | 859 | 19 | 121 | 45 | 45 | 55 | 100 | in grain | 28 | 1.21 | Example |
| 20 | 1189 | 15 | 161 | 35 | 32 | 65 | 97 | in grain | 43 | 1.04 | Example |
| 21 | 989 | 12 | 101 | 35 | 22 | 77 | 99 | in grain | 21 | 1.16 | Example |
| 22 | 1061 | 10 | 109 | 35 | 27 | 73 | 100 | in grain | 28 | 1.08 | Example |
| 23 | 780 | 20 | 87 | 55 | 95 | 2 | 97 | in grain | 27 | 1.21 | Comparative example |
| 24 | 689 | 22 | 79 | 25 | 68 | 0 | 68 | in grain | 24 | 1.13 | Comparative example |
| 25 | 711 | 19 | 78 | 20 | 39 | 61 | 100 | at grain boundary | 0 | 0.94 | Comparative example |
| 26 | 778 | 20 | 104 | 35 | 40 | 59 | 99 | in grain | 22 | 0.95 | Example |
| 27 | 798 | 20 | 88 | 25 | 42 | 57 | 99 | in grain | 27 | 1.38 | Comparative example |
| 28 | 803 | 19 | 76 | 25 | 45 | 54 | 99 | in grain | 27 | 1.41 | Comparative example |
| 29 | 599 | 29 | 67 | 65 | 90 | 5 | 95 | in grain | 2 | 1.10 | Comparative example |
| 30 | 953 | 19 | 87 | 25 | 25 | 72 | 97 | in grain | 25 | 1.38 | Comparative example |
| 31 | 940 | 21 | 89 | 25 | 26 | 73 | 99 | in grain | 25 | 1.31 | Comparative example |
| 32 | 955 | 20 | 78 | 20 | 25 | 75 | 100 | in grain | 25 | 1.60 | Comparative example |
| 33 | 941 | 20 | 77 | 25 | 26 | 73 | 99 | in grain | 25 | 1.60 | Comparative example |
| 34 | 739 | 21 | 101 | 35 | 71 | 29 | 100 | in grain | 27 | 1.11 | Example |
| 35 | 1269 | 12 | 130 | 35 | 25 | 75 | 100 | in grain | 27 | 1.12 | Example |
| 36 | 965 | 15 | 105 | 35 | 52 | 48 | 100 | in grain | 27 | 1.10 | Example |

*Underline indicates that it is outside the scope of the present invention or outside the preferable range.

[Evaluation Results]

As shown in Table 3, in Examples 1, 3, 5, 6, 9, 14, 16, 18 to 22, 26, and 34 to 36, excellent TS, BH, and TDR could In Comparative Example 8, since the annealing time was too short, the hard structure did not have the desired area ratio, and TS and BH were low.

In Comparative Example 10, since the average cooling rate after annealing was too slow, iron carbides such as cementite appeared at the grain boundaries, and TS, BH, and TDR were low.

In Comparative Example 11, since the tempering temperature was too high, iron carbides such as cementite appeared at the grain boundaries, and BH and TDR were low.

In Comparative Example 12, since the C content was too small, ferrite and the hard structure did not have the desired area ratios, the number density of carbides in the ferrite grains was low, and TS and BH were low.

In Comparative Example 13, since the Si content was too small, iron carbides such as cementite appeared at the grain boundaries, and BH and TDR were low.

In Comparative Example 15, since the number of reciprocations of the rough rolling was small and the rough rolling was insufficient, the two-dimensional homogeneous dispersion ratio S was high, and BH and TDR were low.

In Comparative Example 17, since the Mn content was too small, the hard structure did not have the desired area ratio, and TS and BH were low.

In Comparative Example 23, the primary cooling stop temperature after annealing was too high, the hard structure did not have the desired area ratio, and BH was low.

In Comparative Example 24, since there was no tempering step, the hard structure was not tempered and BH and TDR were low.

In Comparative Example 25, since the cooling stop temperature in the plating step was high, iron carbides such as cementite appeared at the grain boundaries, and BH and TDR were low.

In Comparative Example 27, since the rolling reduction difference between the two passes included in one reciprocation of the rough rolling was low, the two-dimensional homogeneous dispersion ratio S was high and BH and TDR were low.

In Comparative Example 28, since the time from the rough rolling to the finish rolling was short, the two-dimensional homogeneous dispersion ratio S was high, and BH and TDR were low.

In Comparative Example 29, since the plating treatment and the alloying treatment were not performed, the bainite fraction was low, and the martensite was not tempered, so that the TS and BH were low.

In Comparative Example 30, since the rolling reduction of the second pass was larger than the rolling reduction of the first pass, the two-dimensional homogeneous dispersion ratio S was high, and BH and TDR were low.

In Comparative Example 31, since the rolling reduction of the third pass was larger than the rolling reduction of the fourth pass, the two-dimensional homogeneous dispersion ratio S was high, and BH and TDR were low.

In Comparative Example 32, since the rolling reductions of the first pass and the fourth pass were too high, the two-dimensional homogeneous dispersion ratio S was high, and BH and TDR were low.

In Comparative Example 33, since the coiling temperature was too high, the two-dimensional homogeneous dispersion ratio S was high, and BH and TDR were insufficient.

INDUSTRIAL APPLICABILITY

The galvannealed steel sheet of the present invention can be used as a structural member of a vehicle, particularly in an automotive industry field.

The invention claimed is:

1. A galvannealed steel sheet having a hot-dip galvannealed layer on at least one surface of a base steel sheet, the base steel sheet comprising, by mass %:
C: 0.03% to 0.30%;
Si: 0.200% to 2.000%;
Mn: 2.00% to 4.00%;
P: 0.100% or less;
S: 0.010% or less;
Al: 0.001% to 2.000%;
N: 0.010% or less;
Ti: 0% to 0.100%;
Nb: 0% to 0.100%;
V: 0% to 0.100%;
Cu: 0% to 1.000%;
Ni: 0% to 1.000%;
Mo: 0% to 1.000%;
Cr: 0% to 1.000%;
W: 0% to 0.005%;
Ca: 0% to 0.005%;
Mg: 0% to 0.005%;
rare earth metals (REM): 0% to 0.010%;
B: 0% to 0.0030%; and
a remainder consisting of Fe and impurities,
wherein the galvannealed steel sheet contains 10% or more and 90% or less of ferrite, and 10% or more of tempered martensite and tempered bainite in terms of an area ratio,
a sum of the ferrite, the tempered martensite, and the tempered bainite is 90% or more,
carbides having a major axis of 50 nm or more and 300 nm or less are contained in grains of the ferrite in a number density of $20/\mu m^2$ or more, and
a two-dimensional homogeneous dispersion ratio S defined by Formula (1) is 0.75 or more and 1.30 or less, $$S = Sy^2/Sx^2 \qquad \text{Formula (1)}$$

where $Sx^2$ in Formula (1) is a dispersion value of Mn concentration profile data in a galvannealed steel sheet width direction, and $Sy^2$ is a dispersion value of Mn concentration profile data in a galvannealed steel sheet thickness direction,
wherein the dispersion values $Sx^2$ and $Sy^2$ are determined as follows:
the galvannealed steel sheet width direction is indicated as an x direction, the galvannealed steel sheet thickness direction is indicated as a y direction, the galvannealed steel sheet is adjusted so that a surface having the rolling direction thereof as a normal direction can be observed, the surface is subjected to mirror polishing, and in a range of 100 μm×100 μm in the center portion of the galvannealed steel sheet in the cross section in the thickness direction of the galvannealed steel sheet, Mn concentrations are measured at 200 points at intervals of 0.5 μm from one side toward the other side along the thickness direction (y direction) of the galvannealed steel sheet by an electron probe microanalyzer (EPMA) device, and, along the width direction (x direction) perpendicular to the thickness direction of the galvannealed steel sheet, Mn concentrations are similarly measured at 200 points at intervals of 0.5 μm from one side toward the other side, wherein the dispersion values $Sx^2$ and $Sy^2$ are obtained from the respective Mn concentration profiles in the x direction and the y direction.

2. The galvannealed steel sheet according to claim 1, wherein the base steel sheet contains one or more of, by mass %;
Ti: 0.003% to 0.100%,
Nb: 0.003% to 0.100%, and
V: 0.003% to 0.100%, in a total amount of 0.100% or less.

* * * * *